Sept. 24, 1957 W. D. ANDERSON 2,807,509
SEALED BEARING STRUCTURE
Original Filed Aug. 31, 1954 2 Sheets-Sheet 1
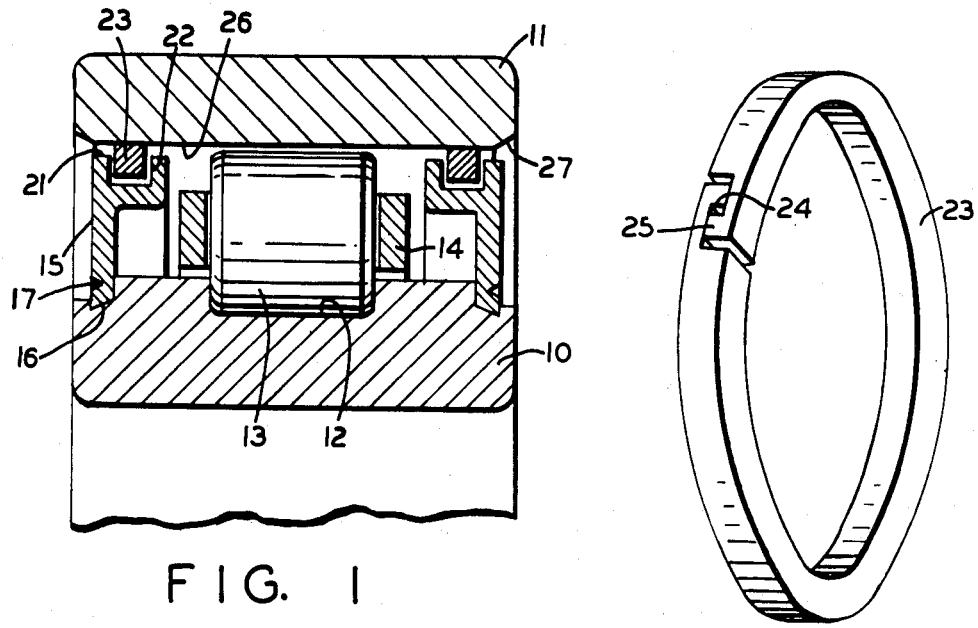
FIG. 1
FIG. 2
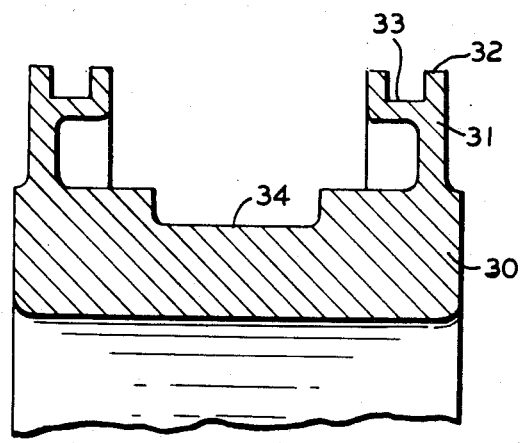
FIG. 3
Inventor
Warren D. Anderson
By John P. Chandler
his Attorney Sept. 24, 1957       W. D. ANDERSON       2,807,509
SEALED BEARING STRUCTURE Original Filed Aug. 31, 1954       2 Sheets-Sheet 2

Inventor
Warren P. Anderson
By John P. Chandler
his Attorney

United States Patent Office 2,807,509
Patented Sept. 24, 1957

2,807,509

SEALED BEARING STRUCTURE

Warren D. Anderson, Glenbrook, Conn., assignor to Norma-Hoffman Bearings Corporation, Stamford, Conn., a corporation of New York Original application August 31, 1954, Serial No. 453,194, now Patent No. 2,759,777, dated August 21, 1956. Divided and this application June 25, 1956, Serial No. 593,501

2 Claims. (Cl. 308—187.1)

This invention relates to separable anti-friction bearings and relates more particularly to a novel sealed bearing structure wherein the sealing means insures retention of the lubricant and prevents foreign particles from entering the sealed area and wherein the inner race member may be readily inserted into and removed from the outer member. This application constitutes a division of my co-pending application Serial No. 453,194, filed August 31, 1954, now Patent Number 2,759,777.

An object of the present invention is to provide a sealed bearing of the type which is packed with grease or other lubricant and wherein the inner and outer race members may be separately applied to the shaft, and to the housing or frame, respectively.

Roller or ball bearing structures of the sealed variety usually have sufficient lubricant for the normal life of the bearing and the inner and outer race members are generally so constructed that after they have been assembled by the maker they cannot be disassembled and reassembled without the necessity of removing or replacing of the sealing members or other parts. In bearings of this character it is impossible for the user to independently fit the inner ring to the shaft and the outer ring to the housing and then to subsequently assemble the shaft to the housing.

The readily separable bearing structure of the present invention has many advantages. It is frequently desirable to press fit the inner ring to the shaft and press fit the outer ring in the frame or housing. If the inner and outer bearing rings are not readily separable there is always the danger that the heavy pressure required to accomplish these press fits may be partially transmitted through the balls or rollers within the bearing and thus damage the raceways.

A separable bearing is especially useful in production line assembly operations wherein the user may mount the inner rings on shafts on one assembly line and mount the outer rings in housings on a separate line, all prior to final assembly on a third line at a later and more convenient time.

An important object of the present invention is to provide a readily separable bearing structure wherein no parts need be replaced during the process of removing the inner ring from the outer ring assembly and wherein the lubricant packed within the sealed bearing is not dissipated during the process.

Another object of the invention is to provide a separable, grease-packed bearing wherein substantially no lubricant can pass out of the sealed enclosure during normal operation and wherein dirt and other foreign particles from without are similarly denied admission, all due primarily to a novel elastic ring positioned in an annular groove in one of the race members and which has an expanding or contracting action and which effects a sealing engagement with a cylindrical surface in the second race member.

Either of the sealed bearings embodying the present invention may have the sealing elements on both sides of the bearing member or they may have it at one end only as in the case of a motor or generator wherein one end of the shaft does not project from the housing, in which case only one side is sealed in order to prevent the lubricant from entering the motor housing.

In the drawings:

Fig. 1 is a broken section taken through a bearing embodying the present invention.

Fig. 2 is a perspective view of one type of an elastic sealing ring employed in the bearing of the present invention.

Fig. 3 is a broken section showing a modified arrangement of the inner race member.

Figure 4:
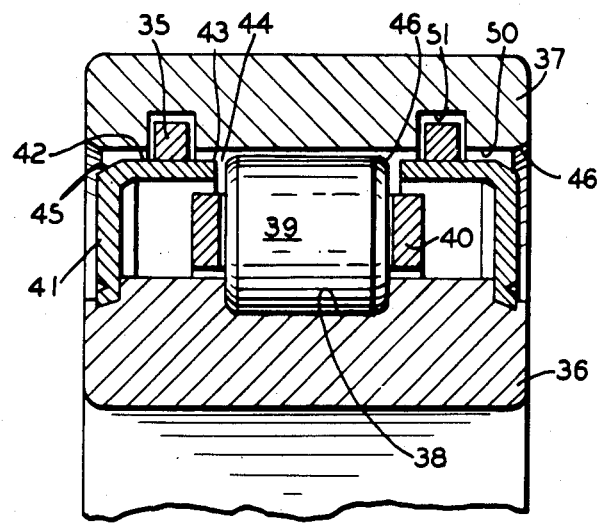
Fig. 4 is a broken section showing a modified bearing structure embodying the present invention.

The structure of Fig. 1 includes inner and outer race members 10 and 11, the former having an annular raceway 12 on its outer surface which receives anti-friction elements 13 which are supported by a retainer 14. The inner ring is further provided with a sealing plate 15 which may be secured thereto in any suitable manner, such as by forming an annular groove 16 to receive the plate and staking the latter as shown at 17.

This sealing plate is formed with a flat annular face and its outer surface is cylindrical as shown at 21 and has an annular groove 22. Within this groove an elastic sealing ring 23 is positioned, the cross-sectional proportion of the ring being such as to have a relatively loose fit in the groove.

The elastic sealing ring can be either a continuous ring or a split ring. If it is continuous it may be made from resilient material such as rubber, plastics, composition materials, or combinations thereof. If an expanding split ring is employed it may have interlocking terminals therefor such as by forming square milled notches 24 near the ends and reducing the thickness of the ends to form abutments or hook-like elements 25.

The expanding sealing rings have an elastic contact with the inner cylindrical surface 26 of the outer ring and forms a sealing contact therewith. It will be noted that there is a slight space between roller 13 and cylindrical surface 26 and accordingly a circle circumscribed around the rollers will be of lesser diameter than the diameter of bore 26 in the outer member. The ends of the bore are beveled at 27 to facilitate entry of the inner structure into the outer structure.

If the outer race member rotates the split sealing rings rotate with it although they remain in the groove 22 when the inner race structure is separated from the outer member. Such separation is readily accomplished as will be apparent and reassembly is equally simple. When the parts are separated the elastic rings have a larger diameter than bore 26 but on reassembly their diameter is constricted as they contact beveled edges 27 and the inner assembly slips easily into the outer member.

Fig. 3 shows a modified inner race member 30 wherein the sealing plate 31 is formed integrally with the race member and this sealing plate otherwise has substantially the same contour as the separate ring of Fig. 1. It includes the outer cylindrical portion 32 and annular groove 33. The ring further has the annular groove 34 for the anti-friction elements.

Figure 5:
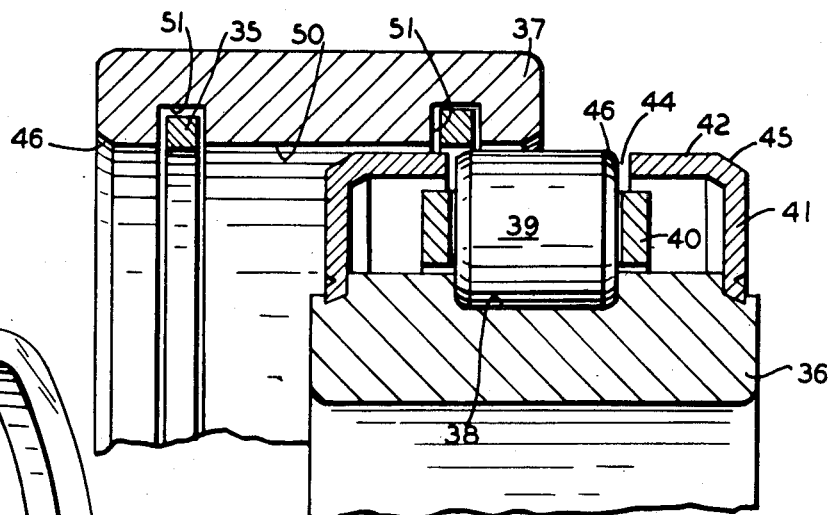
Fig. 5 is similar to Fig. 4 but shows the inner ring partially removed from the outer ring.

In the modified form of Figs. 4 and 5, the elastic sealing rings 35 have a contracting rather than expanding action and accordingly there is no need for the hooked end structure of Fig. 2. To aid in obtaining a tight seal, however, it is preferred that these terminals should have a step-cut lap joint such as is shown in Fig. 4 of Lighthall Patent No. 1,895,167.

The structure includes inner and outer race members 36 and 37, the former having an annular raceway 38 for the anti-friction elements 39 which are secured by retainer 40.

The sealing plate has a flat annular outer wall section 41 and a cylindrical section 42 whose inner edges 43 are spaced from the anti-friction elements. The width of this space 44 should be as small as possible but in all events it must be less than the width of the elastic rings 35. Between section 41 and 42 the plate is beveled at 45. In accordance with standard practice the ends of the rollers are beveled at 46. The split rings have a contracting action on outer cylindrical surfaces 42 and form a sealing contact therewith. Annular grooves 51 are formed in the bore in the outer member adjacent its end faces.

The diameter of the bore in the outer member between the groove 51 and the adjacent outer face thereof is greater than a circle circumscribed around the outside of the rollers. When the inner assembly is moved outwardly (Fig. 5) the elastic rings are freed and contract to a smaller diameter.

Figure 6:
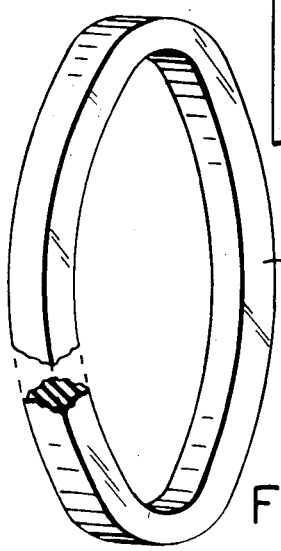
Fig. 6 shows a perspective view of a continuous sealing ring formed of rubber or other resilient material.

Fig. 6 shows a continuous ring 60 formed of resilient material such as rubber. This sealing ring may be employed in connection with any of the embodiments of the invention.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A separable anti-friction bearing comprising an outer race member having a cylindrical bore therein, said bore having an annular groove at one end thereof, an elastic sealing ring positioned within said groove, an inner race member provided with a plurality of anti-friction elements and having an external annular groove which receives the latter, an annular sealing plate secured to the inner member on one side of the anti-friction elements and having a cylindrical exterior surface which is engaged by said elastic ring which exerts a contracting action thereon to form a sealing contact therewith, the diameter of the cylindrical bore between the groove and the adjacent outer face of said outer member being greater than the diameter of a circle circumscribed on the outside of the anti-friction elements to permit the inner member to be separated from the outer member.

2. A separable anti-friction bearing comprising an outer race member having a cylindrical bore therein, said bore having an annular groove at each end thereof, an elastic sealing ring positioned within said groove, an inner race member provided with a plurality of anti-friction elements and having an external annular groove which receives the latter, annular sealing plates secured to the inner member on each side of the anti-friction elements and having cylindrical exterior surfaces which are engaged by said elastic rings which exert a contracting action thereon to form sealing contacts therewith, the diameter of the cylindrical bore being greater than the diameter of a circle circumscribed on the outside of the anti-friction elements to permit the inner member to be separated from the outer member.

References Cited in the file of this patent

FOREIGN PATENTS 812,175   France _____ Jan. 27, 1937